Patented Mar. 24, 1942

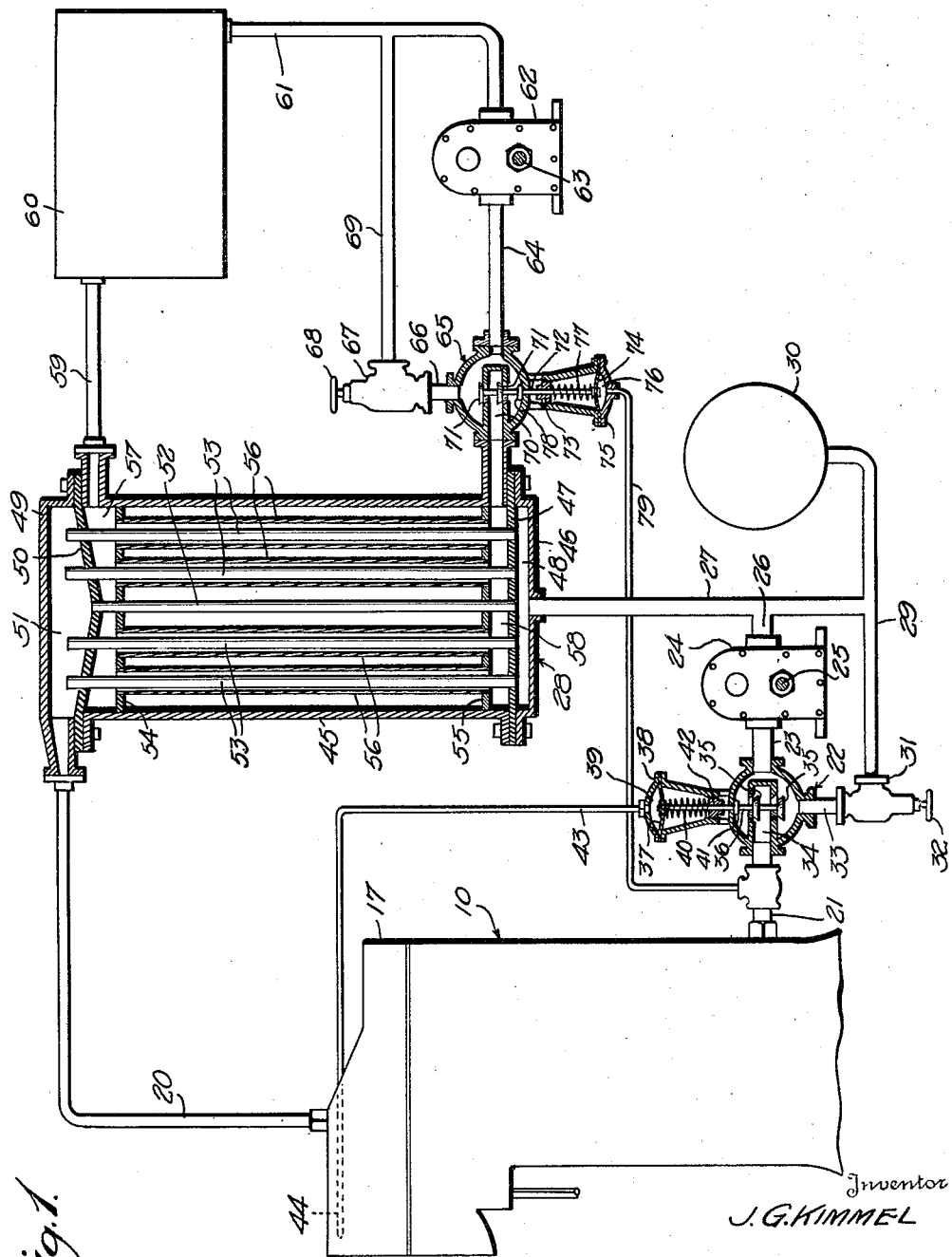

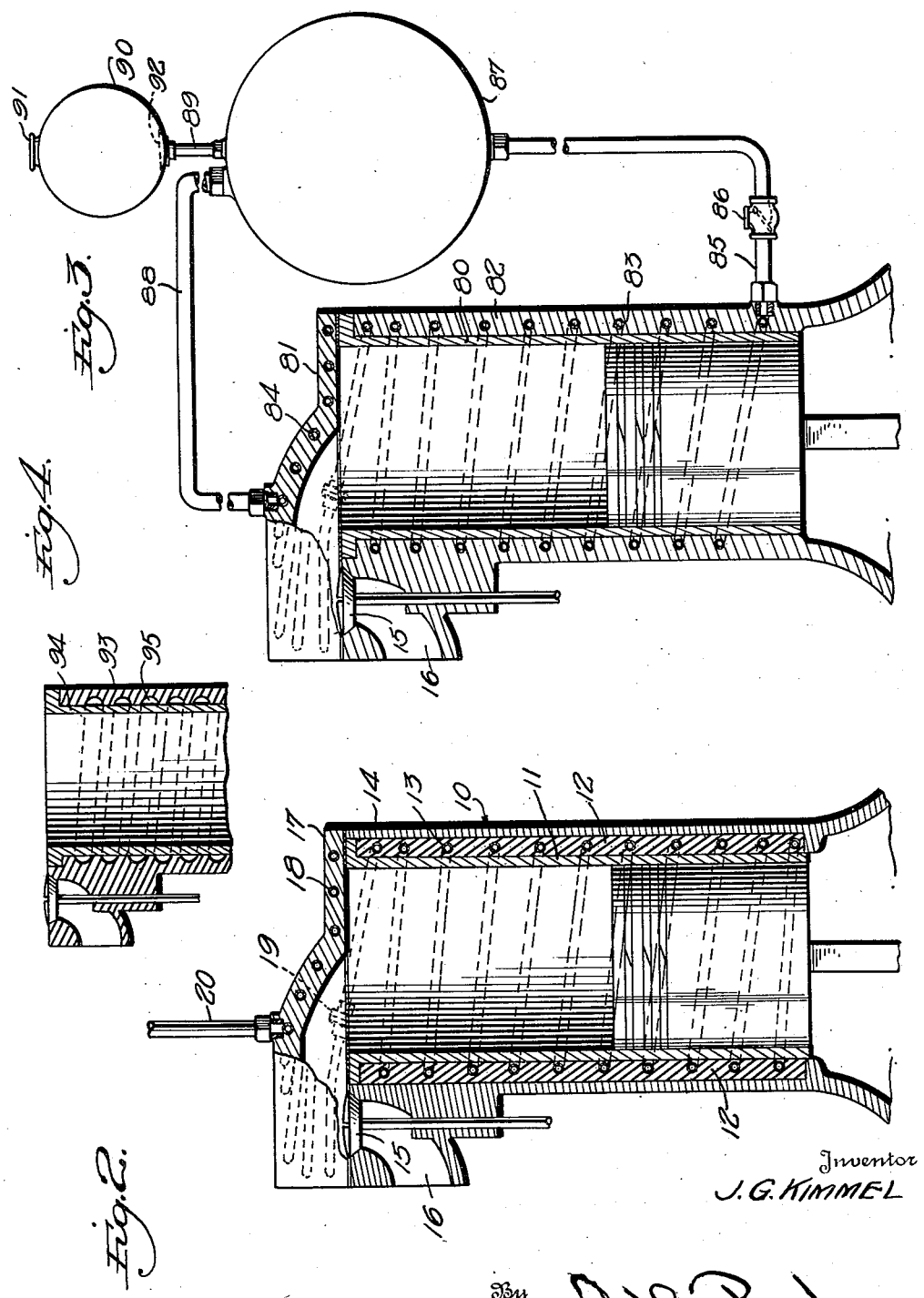

2,277,113

UNITED STATES PATENT OFFICE 2,277,113

INTERNAL COMBUSTION ENGINE

Joseph G. Kimmel, Sarasota, Fla.

Application February 28, 1939, Serial No. 259,013

17 Claims. (Cl. 123—178)

This invention relates to internal combustion engines, and more particularly to a method and apparatus for controlling the temperatures of the combustion chamber walls of such engines.

The present application is a continuation-in-part of my copending application Serial No. 751,397, filed November 3, 1934, now abandoned.

It is the common practice to control the temperature of an internal combustion engine cylinder by passing a cooling liquid through passages around the cylinder and cylinder head to transfer the heat from the combustion chamber walls to the cooling liquid, and then to circulate the heated liquid through a suitable radiator or the like. The cooling fluid is then returned in a cyclic operation to the passages around the cylinder and cylinder head. This is the generally accepted method of controlling the temperatures of an internal combustion engine and while it is practicable and fairly satisfactory in operation, it is open to several disadvantages and is relatively inefficient.

The disadvantages of a conventional engine cooling system of the type referred to are well known and recognized. For example, the capacity of the conventional cooling system is relatively great since the inherent characteristics of the system are such as to require a relatively large volume of cooling liquid to prevent overheating of the engine under maximum load conditions. Therefore, the quantity of cooling liquid is too great under all other heat load conditions and accordingly internal combustion engines operate under most conditions at temperatures below the most efficient temperature of operation. There are other inherent disadvantages in a system of this character which need not be discussed in detail.

An important object of the invention is to provide a novel method of controlling the flow of cooling fluid around the cylinder of an internal combustion engine so as to maintain the combustion chamber walls within relatively close limits of minimum and maximum temperatures adjacent the temperature of maximum operating efficiency.

A further object is to provide a method of controlling the rate of flow of the cooling fluid and the nature of such flow so as to effectively control the temperatures of the combustion chamber walls.

A further object is to provide a method of the character referred to for utilizing increasing temperatures of the combustion chamber walls for causing the flow of the cooling liquid to become at least partially turbulent to thus increase the rate of heat transference and thus assist in maintaining the temperatures of the combustion chamber walls within the desired limits.

A further object is to provide a method of the character referred to which is fully automatic in operation to control the cooling fluid in such a manner as to maintain a more uniform optimum operating temperature in the combustion chamber walls under varying heat load conditions.

A further object is to provide a novel apparatus for controlling the rate of heat transfer to a fluid temperature controlling medium of an internal combustion engine to maintain a more uniform optimum operating temperature in the combustion chamber walls.

A further object is to provide a novel apparatus of the character referred to wherein the transfer of heat from the combustion chamber walls to the fluid medium takes place far more rapidly under heavy heat load conditions than is possible with conventional cooling systems, thus providing for the efficient controlling of the engine temperatures with a much smaller volume of the fluid medium.

A further object is to provide a temperature controlling system for internal combustion engines wherein the maintenance of combustion chamber wall temperatures within relatively close minimum and maximum limits results in a substantial reduction in the internal stresses in the cylinder walls, thus permitting the use of relatively thinner walls.

A further object is to provide an internal combustion engine temperature regulating system which functions to permit the engine to warm up rapidly, and which eliminates the loss of the temperature controlling fluid.

Other objects and advantages of the invention will become apparent during the course of the following description.

In the drawings I have shown several embodiments of the invention. In this showing:

Figure 1 is a schematic view showing a preferred form of system, parts being shown in section, Figure 2 is a detail central vertical sectional view through an internal combustion engine cylinder, Figure 3 is a similar view shown in connection with a modified type of temperature controlling system, and, Figure 4 is a fragmentary sectional view of the head end of an internal combustion engine cylinder showing a modified type of fluid passage.

Referring to Figures 1 and 2, the numeral 10 designates a cylinder as a whole of an internal combustion engine comprising a relatively thin cylinder liner 11 surrounded by a body of a metal 12 of high heat conductivity such as copper or aluminum. A helical tube 13 is embedded in and bonded to the metal 12 and the latter is bonded to the liner 11, thus providing an efficient means for transferring heat from the cylinder liner to the fluid to be referred to which flows through the tube 13. The metal 12 may be surrounded by a shell or jacket 14. One of the valve of the engine is indicated by the numeral 15 and controls communication through a port 16.

The cylinder is provided with a head 17 in which is embedded a coil 18 which forms a continuation of the coil 13 and may be connected thereto as at 19. The coil 18 has communication with a fluid pipe 20 through which fluid flows from the coils 13 and 18. The lower end of the coil 13 is provided with an inlet pipe 21 (Figure 1).

The pipe 21 receives cooling or temperature controlling fluid flowing thereto through a control valve indicated as a whole by the numeral 22. The control valve receives fluid through a pipe 23 and the fluid is pumped through this pipe by a suitable pump 24, preferably of the rotary positive type and provided with a drive shaft 25 which may be driven by some part of the engine 10. The intake pipe 26 of the pump receives fluid from a pipe 27 one end of which communicates with a condenser indicated as a whole by the numeral 28 and to be referred to in detail later. The other end of the pipe 27 communicates with a pipe 29 one end of which leads to an expansion chamber 30 in which air is trapped, as will be described. The other end of the pipe 29 leads to the outlet side of a pressure relief valve 31 and the pressure at which this valve opens may be adjusted by a handle 32. Any desired form of pressure relief valve may be employed and forms no part per se of the present invention. The top of the relief valve, as shown in Figure 1, communicates with the bottom of the valve 22 through a pipe 33.

The valve 22 is provided therein with a chamber 34 which communicates with the pipe 21 and communication between this chamber and the interior of the main casing of the valve 22 is controlled by valve elements 35. These valve elements are normally slightly spaced from their seats so that some circulation of fluid from the pump 24 to the pipe 21 will take place at all times. The valves 35 are adapted to be opened to a greater extent as the heat load of the engine increases. The valves 35 are carried by a stem 36 extending upwardly for connection with a diaphragm 37 housed by the upper end of the control valve and covered by a cap 38 with which it combines to form a pressure chamber 39. A spring 40 urges the stem 36 upwardly to tend to close the valves 35, but as previously stated, these valves never entirely close and may be provided with any suitable means such as a collar 41 to limit the upward movement of the valves. The stem 36 operates in a bearing 42 against which the spring 40 engages, the bearing being threaded in the valve casing to permit adjustment of the tension of the spring. A pressure pipe 43 communicates at one end with the chamber 39 and has its other end connected to a temperature bulb 44 preferably arranged in the cylinder head 17. The bulb 44 is preferably located at such point as to reflect the temperature of the inner wall of the hottest part of the engine combustion chamber. It will be apparent that as the temperature rises at the bulb 44, pressure in the pipe 43 and chamber 39 will force the diaphragm 37 downwardly to open the valves 35 to a greater extent and thus permit a more rapid flow of fluid through the pipe 21 to the lower end of the coil 13. The capacity of the pump 24 is such that it obviously pumps fluid at a rate greater than can be taken care of past the valves 35, and the excess fluid is bypassed around the pump by the relief valve 31 and pipes 29 and 27.

The condenser 28 comprises a main casing 45 having a lower head 46 above which is arranged a plate 47 forming therewith a chamber 48 with which the upper end of the pipe 27 communicates. An upper head 49, forming the top of the condenser, is arranged over a plate 50 and forms therewith a chamber 51 communicating with the pipe 20, as shown in Figure 1.

The plate 50 slopes downwardly toward its center to drain liquid into a vertical pipe 52, the lower end of which extends through the plate 47 to return liquid to the chamber 48. The pipe 52 is surrounded by a plurality of pipes 53 all of which extend through the plate 47 to communicate with the chamber 48, but the upper ends of the pipes 53 extend upwardly into the chamber 51 to receive vapor therefrom. Upper and lower headers 54 and 55 are arranged in the casing 45 and tubes 56 are connected between the headers 54 and 55 as shown in Figure 1. Each tube 56 surrounds one of the pipes 53 in concentric relation therewith. The upper header 54 forms with the plate 50 a fluid chamber 57 while the lower header 55 forms with the plate 47 a lower chamber 58.

The upper chamber 57 communicates through a pipe 59 with a heat exchanger 60 which may be a radiator, cooling tower or the like. It will become apparent that if a suitable supply of water is available as the condensing liquid, the heat exchanger 60 may be eliminated. A pipe 61 leads from the heat exchanger to a pump 62, similar to the pump 24, and preferably of the rotary positive pump type. This pump is provided with a drive shaft 63 which may be driven by the internal combustion engine.

The outlet of the pump 62 is connected by a pipe 64 to a control valve unit 65. A pipe 66 connects the interior of the valve unit 65 with a pressure relief valve 67 of any desired type, adjustable through a handle 68. The relief valve 67 may be similar to the valve 31 and any desired type of relief valve may be employed. The outlet of the relief valve 67 is connected by a pipe 69 to the pipe 61 to provide a by-pass for excess fluid delivered by the pump 62 to the valve unit 65, as will become apparent.

The valve unit 65 is similar to the valve 22 and is provided with a chamber 70 communicating with the chamber 58 of the condenser to deliver liquid thereto. Communication through the valve 65 is controlled by a pair of valve elements 71 carried by a stem 72 extending through a bearing 73. The valve unit 65 is provided with a diaphragm 74 capped as at 75 to provide a chamber 76, and a spring 77 is arranged between the diaphragm 74 and bearing 73 to tend to urge the valves 71 toward closed position. The bearing 73 is threaded in the valve casing to provide for adjustment of the tension of the spring 77. The valves 71 likewise may be provided with means, such as a collar 78, to limit their movement toward closed position so that they will never completely close. A pressure pipe 79 is connected between the chamber 76 and pipe 21 whereby pressure generated incident to the heat of the engine will act against the diaphragm 74 to open the valves 71, depending upon the pressure present in the pipe 21 and tube 13 as will be referred to later.

A simplified form of system is shown in Figure 3, the results of the use of this system being far more satisfactory than conventional engine cooling systems but not as satisfactory as the results obtained with the system shown in Figure 1. Referring to Figure 3, the cylinder proper is indicated by the numeral 80 and the engine is provided with a cylinder head 81. The head may be formed of a metal of high thermal conductivity such as copper or aluminum, and the cylinder is surrounded by a jacket 82 of similar metal which may be cast around the cylinder 80, or may be pre-cast and shrunk thereon. A coil of tubing 83 is embedded in the jacket 82 and is connected to one end of a similar coil 84 embedded in the head 81. These two coils form continuations of each other as in the form of the invention previously described.

The lower end of the coil 83 is connected to one end of a pipe 85 in which is preferably arranged a check valve 86 to prevent the surging of the fluid in the system, as will become apparent. The pipe 85 leads to a suitable condenser 87, which may be an ordinary radiator. The top of the condenser 87 is connected by a pipe 88 to the end of the coil 84. A pipe 89 connects the top of the condenser to an expansion bulb or chamber 90 provided with a cap 91 which may be in the form of an adjustable relief valve through which the system may be filled with liquid such as water and through which the temperature of the water may be regulated in a manner to be described. The level of the liquid normally is substantially at the height indicated by the dotted line 92.

The use of coils for the passage of the fluid around the cylinders is advantageous since a tube with relatively thin walls can carry safely the highest pressure which will be used in the system. In smaller engines in which moderate pressures will be present in the fluid system the tubes may be eliminated in favor of a structure such as that shown in Figure 4. The cylinder is indicated by the numeral 93 and surrounds a liner 94 and the inner surface of the cylinder 93 may be provided with a helical groove 95 forming with the adjacent wall of the liner 94 a helical conduit for the circulation of fluid around the cylinder liner.

The operation of the form of the invention shown in Figures 1 and 2 is as follows:

The entire engine cooling system is filled with liquid, such as water, with the exception of the expansion chamber 30 which is filled with air. As the engine warms up, vapor collects in the upper chamber 51 of the condenser and in the tubes 52 and 53, thus creating a pressure which displaces liquid in the system into the expansion chamber 30 to compress the air therein. As the pressure increases due to the heating and loading of the engine, the pressure in the temperature regulating system increases up to a maximum point of balance to be referred to later.

The stop member 41 (Figure 1) limits closing movement of the valves 35 so that the continuous operation of the pump 24 by the engine 10 causes at least some circulation to take place through the helical tube 13 (Figure 2) even when the motor is first started in operation. The positions of the valves 35 are temperature controlled by the temperature bulb 44. As the walls of the combustion chamber become hotter, the temperatuer bulb fluid expands to create a pressure in the pipe 43, and this pressure is transmitted to the diaphragm chamber 39 to open the valves 35 to a greater extent. For any given speed of the engine the pump 24 will cause a flow of liquid at least equal to the maximum demands of circulation through the helical pipe 13 as will become apparent, and under most conditions, therefore, there is an excess amount of liquid pumped in proportion to the opening of the valves 35 and the excess liquid being pumped creates a pressure in the body of the valve unit 22 to open the relief valve 31 and thus by-pass liquid around to the intake side of the pump 24.

Depending upon the positions of the valves 35, as determined in accordance with engine temperatures in the manner stated, liquid will be pumped through the pipe 21 to the lower end of the helical tube 13, thence through this tube and through the tube 18 of the cylinder head, and the fluid flows through the pipe 20 to the upper condenser chamber 51. Any water in the fluid reaching the chamber 51 will flow down the inclined surfaces of the plate 50 and thus drain downwardly toward the bottom chamber 48 through the pipe 52. The vapor flowing into the chamber 51 will flow downwardly through the pipes 53 to be condensed in a manner to be described for recirculation through the chamber 48, pipes 27 and 26 and pump 24.

A condensing liquid, preferably water, is circulated through the system including the pipes 56, chamber 57, pipe 59, heat exchanger 60, pipe 61, pump 62, etc. The heat exchanger 60 is employed for dissipating heat from the condensing liquid and where ample water supply is available the heat exchanger 60 may be dispensed with and water may be fed to the pipe 61 and discharged from the pipe 59.

The mechanism for controlling the rate of flow of the condensing liquid is similar to the mechanism described for controlling the flow of the fluid for controlling the temperature of the engine except that the positions of the valves 35 are controlled by the temperature of the combustion chamber walls of the engine while the positions of the valves 71 are controlled by pressure in the engine circulating system, and more particularly by the pressure adjacent the inlet end of the coil 13. The pump 62 may be conveniently driven from any part of the engine 10 and normally pumps condensing liquid through the pipe 64 at an excessive rate in order to provide the maximum condensing action in the condenser when desired. The excess liquid pumped into the valve unit 65 creates a pressure therein which opens the relief valve 67, thus by-passing the liquid through the pipe 69 to the intake side of the pump 62.

The stop member 78 prevents complete closing of the valves 71 and accordingly at least some circulation of condensing liquid is maintained through the condenser pipes 56, each of which surrounds one of the vapor pipes 53. As the pressure in the temperature controlling system, and more particularly the pressure in the portion of the coil 13 surrounding the combustion chambers, increases this pressure will be communicated through the pipe 79 to the chamber 76 thus operating against the diaphragm 74 to open the valves 71 to a greater extent and thus increase the rate of circulation of the condensing liquid through the pipes 56. This action obviously causes an increased rate of condensation of vapor in the pipes 53 and tends to reduce the pressure in the temperature controlling system.

The foregoing describes the operation of the parts of the apparatus in a general way, but there are several factors which enter into the practice of the method with the apparatus by means of which the temperature of the combustion chamber walls of the engine may be controlled within relatively close minimum and maximum limits in order that the engine may be caused to operate at or very close to its temperature of most efficient operation. In this connection, attention is invited to the fact that the present apparatus is a temperature controlling system rather than an engine cooling system as is true in conventional constructions. In a conventional engine a relatively large volume of cooling fluid is employed and this is necessary because of the inherent inefficiency of the system. The flow of the fluid through the jackets of the engine is largely "streamline," which flow will be referred to later, in which case the rate of heat transfer is relatively slow. The rate of heat transference in a conventional engine is further reduced by the formation of a heat insulating film of steam against the faces of the water jacket adjacent the walls of the combustion chamber. Thus it is necessary to use a substantial volume of cooling liquid with the result that engine overheating may be prevented, but under most operating conditions the engine is operating at too low a temperature for efficiency.

Moreover, the cooling liquid in conventional systems is circulated by a pump connected to the engine to be operated thereby, and accordingly the rate of circulation of the fluid depends directly upon engine speed and not upon the heat loads of the engine. If the engine is operating at a relatively high speed under minimum load conditions, therefore, the engine is maintained substantially below its temperature of efficient operation. On the other hand, if the engine is operating relatively slowly under heavy load conditions, heat will not be dissipated sufficiently rapidly and the engine will be operating at a temperature substantially above its temperature of maximum efficiency.

The present system takes into account, among other things, the difference in the heat transferring characteristics between a "streamline" flow of liquid and a turbulent flow thereof. The term "streamline" as used herein refers to the flow of individual particles of fluid in more or less parallel lines as distinguished from the turbulent flow of fluid referred to below.

The difference between streamline and turbulent flow has been fairly well set forth in various texts dealing with this subject and reference is made to the expression, known as Reynolds number, $DVe/\mu$ wherein $D$ equals the diameter in feet of a pipe or duct through which the fluid is flowing, $V$ equals the velocity of the fluid in feet per second, $e$ equals density in pounds per square foot, and $\mu$ equals viscosity in pounds per second per foot. A value of Reynolds number less than 2100 indicates streamline flow; from 2100 to 3100 indicates mixed flow; and above 3100 indicates turbulent flow. The Reynolds number for the average velocity of water through the cooling systems of present day engines indicates generally a streamline flow, or at best a mixed streamline and turbulent flow.

In order that an adequate idea may be gained as to the difference in heat transference under different conditions of flow of a cooling medium, attention is invited to a fairly well known equation by Maleev which gives a heat transfer between metal wall and water ranging from 150 to 330 B. t. u. for a water velocity of 9 feet per minute, and from 300 to 780 B. t. u. for a water velocity of 64 feet per minute. These velocities cover the average range of present day practice and the variations with the same velocities are due to sharp turns in the parts of the cooling system. Increasing the velocity to the point of turbulence produces the following results: The velocity of 1 foot per second through a ¼ inch pipe results in the thermal conductivity of 604 B. t. u.; 6 feet per second, 2600 B. t. u.; and 10 feet per second, 3814 B. t. u.

From the foregoing it will be obvious, and it is fairly well known, that stepping up the flow of a fluid into the range of turbulent flow increases the rate of heat transference far beyond the rate of increase in the flow of the fluid. Utilizing this principle, I have found that high temperatures and high pressures may exist in the cooling or temperature controlling fluid without increasing the cylinder wall temperature due to the increased rate of heat transference between the cylinder wall and the fluid. In other words, a relatively large body of cooling fluid ordinarily is required at a relatively low temperature to prevent overheating of an engine, whereas a proper turbulence in the flow of the fluid permits the use of a relatively small volume of fluid at relatively high temperatures.

In this connection it is noted that while the circulating pump 24 for the temperature controlling fluid may be conveniently operated by the engine whereby its speed and pumping capacity varies with the engine speed, the rate of flow of the fluid through the helical tube 13 is governed directly by the temperature of the combustion chamber walls, such temperature being utilized in the manner described to determine the degree of opening movement of the valves 35 and thus determine the rate of circulation through the temperature controlling system. As the heat load on the engine increases, the valves 35 will be progressively opened, thus decreasing the by-passing of the fluid through the relief valve 31 and increasing the rate at which the fluid is pumped through the helical tube 13. The parts of the apparatus are designed and adjusted so that the degree of turbulent flow increases at the proper rate in accordance with increased heat load conditions so as to predetermine a maximum temperature of the combustion chamber walls. In accordance with the foregoing discussion it will be apparent that the rate of heat transference between the combustion chamber wall and the fluid in the tube 13 will be progressively accelerated to the point where the transferring of heat from the combustion chamber walls to the fluid will prevent any further increase in combustion wall temperatures.

In its broadest aspects, therefore, the invention contemplates the use of a relatively small volume of heat-controlling fluid and the automatic controlling of the rate of flow of the fluid in accordance with the heat load conditions in the engine to predetermine maximum temperatures. It will be obvious that as the heat load decreases, the valves 35 will be moved toward their closed position, thus progressively reducing the rate of flow of the fluid as the heat load decreases. Under relatively low heat load conditions, therefore, the rate of flow will be reduced to the point where the reduced heat units in the combustion chamber walls may be readily transferred to the fluid without substantially lowering the combustion chamber temperature as is true in conventional practice. Thus the apparatus functions in accordance with the method to provide a minimum operating temperature for the combustion chamber walls under minimum heat load conditions.

Where water is employed as the temperature controlling fluid it will be apparent that steam will be generated in the coil 13, and this fact, together with the use of a turbulent flow of fluid under substantial heat load conditions, permits the maximum temperature of the combustion chamber walls to be maintained at the desired point, it being apparent that substantial heat units are absorbed in converting the water into steam.

Under relatively heavy heat load conditions a finer control of the temperature may be provided by increasing the rate of condensation in the condenser 28. As the pressure in the pipe 21 increases, such pressure acts through the pipe 79 against the diaphragm 74 to open the valves 71 to a greater extent, thus increasing the rate of flow of the condensing fluid through the pipes 56. Thus an increased condensing action is provided upon the increasing of the rate of generation of steam in the coil 13 incident to the presence of increasing heat loads.

Of course, it is not a function of the condenser to keep pressures in the temperature controlling system at or close to atmospheric pressure. It will be apparent that as pressures in the temperature controlling system decrease, the decreased pressure in the chamber 76 permits the spring 77 to move the valve 71 toward closed position and thus reduce the flow of the condensing liquid, and consequently reduce the condensing rate. The parts are so adjusted as to provide for a maximum pressure in the pipe 21 and when such pressure is reached the rate of flow of the condensing liquid will condense vapor in the temperature controlling system at a sufficient rate to prevent any further increases in pressure to occur.

Attention is invited to the fact that the maintenance of pressure in the temperature controlling system is highly advantageous, and the system is preferably so designed and adjusted as to provide relatively high pressures under low heat load conditions on the engine. For example, the temperature control parts associated with the regulating system for the temperature controlling liquid are so designed that the rate of flow of fluid through the coil 13 will be sufficiently slow under low heat load conditions to cause a greater pressure and consequently a greater temperature in the temperature controlling fluid, particularly in that part of the coil 13 surrounding the combustion chamber, than when operating under heavy heat load conditions. The operation of the valves 71 will limit the generation of pressure in the manner stated to prevent accumulation of dangerous pressures, and a distinct advantage is derived from causing the rate of flow of the temperature controlling fluid under low heat load conditions to be such as to permit increased pressures in the temperature controlling system, particularly in that part of the coil 13 surrounding the combustion chamber. As is well known, the boiling point of a liquid becomes higher as the pressure on the liquid is increased. By maintaining lower pressures in the coil 13 under heavy heat load conditions the liquid therein will be converted into steam and thus absorb heat units at a relatively rapid rate to prevent the maximum combustion chamber wall temperature from going above the desired point. Thus such point may be maintained only slightly above the temperature of maximum operating efficiency.

On the other hand, by maintaining higher pressures in the coil 13 under lower heat load conditions, the temperature of the liquid in the system must rise to a substantially higher point before boiling. Thus it will be apparent that the rapid transferring of heat to the temperature controlling fluid under light heat load conditions due to the boiling of the liquid can be minimized and a greater proportion of the fluid in the coils 13 will be in liquid form with the temperature of such liquid higher than under heavier heat load conditions. Such higher temperature of the liquid will be closer to the temperature of the combustion chamber walls and the reduction in the temperature differential thus provided minimizes the rate of heat transfer and permits a higher minimum temperature, closer to the temperature of maximum operating efficiency.

It will be apparent that the only part of the temperature controlling system in which the regulation of pressure and hence temperature is beneficial is in the portions of the fluid tubes surrounding the combustion chamber. As will become apparent, the pressures in the pipe 21 may be kept within relatively narrow minimum and maximum limits, for example, 2 lbs. The control apparatus for the valve 65 thus can be designed so that only a small change in pressure in the pipe 21, and consequently in the pipe 79, will be sufficient to produce the full range of operation of the valves 71.

An actual case will assist in making clear the relationship which is most desirable between the temperature, pressure and rate of flow of the fluid in the fluid tubes around the combustion chamber. It will be assumed that a change in pressure in the pipe 21 of 2 lbs. between minimum and maximum will operate the valves 71 through their full range, and that a loss of head of 12 lbs. is required to force the fluid through the coil in the engine jacket at high heat loads because of the relatively high friction encountered by the fluid under such conditions, that is, the friction occurring incident to the pumping of the fluid through the coils at a relatively high speed. It also will be assumed that a pressure of 100 lbs. absolute is present in the temperature control system, at which pressure the temperature in the coils will be 323°, this condition being present at minimum heat loads. Since the rate of flow under such conditions is slow, as governed by the temperature responsive means for operating the valves 35, the friction loss in the fluid tubes will be small and therefore practically the same pressure will exist throughout the entire system.

When the engine is operating under high heat loads, however, the pressure in the pipe 21, and consequently in the pipe 79, will reach 102 lbs., which pressure will open the valves 71 to the point where the increased rate of condensation will reduce the fluid pressure in the condenser and consequently in the pipe 20 leading from the engine, so that the pressure in the fluid leaving the engine will be reduced to 90 lbs., thus giving the pressure differential of 12 lbs. necessary to force the fluid through the coil, a condition referred to above. At such pressure the temperature in the coil 13 will drop to 320°. Thus it will be apparent that under low heat load conditions relatively high pressures and consequently relatively high temperatures will exist in the coil 13 to minimize the temperature differential between the cylinder wall and the fluid and consequently reduce the rate of heat transfer. The higher pressure in the coil 13 likewise raises the boiling point of the fluid, thus further minimizing the rate of heat transference incident to converting the water into steam. The practice of the method therefore keeps the temperature of the walls of the combustion chamber at a relatively high minimum temperature under light heat load conditions.

On the other hand, the lower pressures present in the coil 13 under heavy heat load conditions increases the rate of heat transference through the absorption of heat in converting the liquid into steam, the rate of heat transference being further increased by the greater temperature differential between the combustion chamber walls and the fluid. Moreover, under such heavy heat load conditions, the rate of flow of the fluid through the coil 13, as previously stated, is at least partly turbulent, thus providing for an even greater rate of heat transference. Thus the method operates to maintain a relatively low maximum temperature in the combustion chamber walls under maximum heat load conditions. Accordingly it will be apparent that the present invention operates very efficiently to maintain both the minimum and maximum temperatures of the combustion chamber walls very close to the temperature of maximum engine efficiency.

It will be apparent that the present invention operates to maintain the cylinder wall at a relatively uniform temperature as distinguished from merely controlling the temperature of the fluid, and in the preferred practice of the method, the temperature of the fluid rises and falls inversely with the rise and fall of the heat developed in the engine. Proper design and adjustment provides a concrete degree of turbulence in the fluid in accordance with definite variations in heat loads, and accordingly the system operates to induce a rate of heat transfer from cylinder wall to fluid having a substantially constant ratio to the heat units to be removed from the cylinder wall.

The expansion chamber 30 provides ample space for the expansion of the fluid in the temperature control system as pressure therein increases. The size of the expansion chamber, of course, affects the graduation in pressures incident to the generation of steam in the coil 13 and assists in providing the fine controlling of the temperature by the system. It will be apparent that the system provides for the controlling of the rate of heat transference principally by controlling the rate and nature of the flow of fluid through the coil 13, the rate of flow being increased as heat loads increase in the engine and the cross-sectional area of the coil 13 being so related to the flow of fluid as to cause the flow to change to a turbulent flow or a mixed streamline and turbulent flow depending upon the rate at which it is necessary to carry off heat under the heat conditions in the engine.

The designing and adjustment of the parts by which greater pressure is present in the coil 13 under light heat load conditions further increases the fineness of the controlling of the temperatures of the combustion chamber walls, as explained above. The use of the body of metal 12 of high heat conductivity is useful in assisting in the transferring of heat from the cylinder liner 11 to the tube 13 from which the heat is efficiently transferred to the fluid therein. It will be obvious that the use of the metal 12 is desirable, but not necessary.

There are important advantages inherent in the method and apparatus other than the maintenance of the engine at or close to its temperature of maximum efficiency. For example, the maintenance of uniform temperatures permits the use of a thinner cylinder wall, the slightly different temperatures between the cylinder wall and the cooling medium reducing the internal stresses in the metal of the liner. Moreover, the use of a smaller volume of temperature controlling fluid permits the engine to warm up more rapidly than a conventional engine, and the advantages of the rapid warming up of an internal combustion engine are well known.

The system shown in Figure 3 is wholly practicable and is highly advantageous over conventional systems, although it does not provide as fine a temperature control as the system previously described, as will become apparent. In the operation of the modified form of the invention, the system is filled with water or other temperature controlling fluid through the cap 91, the water filling the condenser 87, coils 83 and 84 and the piping connections 85 and 88. The normal level of the water when the chamber 90 is employed as an expansion chamber is indicated by the numeral 92. It will be apparent that the system is entirely sealed from the atmosphere under normal conditions. As the engine warms up the water in the coils 83 and 84 absorbs heat as will be apparent, and is finally at least partially converted into steam, depending upon the heat load in the engine. The expansion in the system incident to the conversion of some of the water into steam causes an increase in the specific volume of the fluid, thus resulting in an increase in pressure in the entire system, which is closed as previously stated.

It will be apparent that the increase in the volume of the fluid raises the level of the fluid in the chamber 90 and compresses the air trapped in the chamber. The continued expansion of the cooling fluid and the continued increase in the pressure of the air in the chamber 90 finally reaches a point of equilibrium at which point steam will be condensed at a rate equal to the generation of steam in the coils 83 and 84. As the fluid is heated in the coils its density decreases, and this obviously is particularly true after the generation of steam commences.

The system shown in Figure 3 is purely thermo-syphonic in action, and prior to the generation of steam in the coils 83 and 84, the unbalancing of the two columns of the system obviously is such as to only slightly unbalance these columns to cause a relatively slow circulation of fluid. The generation of steam in the coils 83 and 84 further unbalances the two columns and thus materially increases the speed of circulation of fluid, the unbalancing of the two columns and the rate of fluid flow obviously continuing to increase as the generation of steam in the coils increases. The theoretical maximum rate of fluid circulation obviously will be reached when all of the fluid in the coils is converted into steam.

Since steam at 350° F. weights approximately 1/200 of an equal volume of water, it will be apparent that the rate of circulation in the system, under heavy heat load conditions, will be far greater than that which takes place in a conventional thermo-syphonic engine cooling system. The rate of circulation has been found ample to cause turbulence in the water flowing through the coils 83 and 84. This turbulence increases as the columns of the system are increasingly unbalanced, which operation is due, in turn, to increasing heat load conditions. As previously explained, the rate of heat transference is greatly accelerated by the turbulent flow of the fluid and thus it follows that the greater the heat load on the engine the greater will be the rate of heat transference to provide the desired maximum temperature of the cylinder walls. The check valve 86 may be provided to prevent any surging in the pipe 85, as will be apparent.

While the condenser in Figure 3 has been shown approximately at the level of the top of the engine cylinder, attention is invited to the fact that the condenser may be placed at any elevation to provide the necessary head whereby the two fluid columns may be sufficiently unbalanced to circulate the fluid at the desired rate.

The modified form of system does not as closely control the difference between minimum and maximum combustion chamber wall temperatures as the previously described form of the invention. This is due to the fact that the pressure in the system is at its maximum when the engine heat load is at maximum, while the pressure in the system obviously is at its minimum under minimum heat load conditions. However, the system is advantageous because of its simplicity, and is a very distinct improvement over conventional practice. It will be apparent that the system operates automatically to increase the rate of flow of fluid under increased heat load conditions, and the system is so designed with relation to the cross-sectional area of the coils 83 and 84 as to provide the necessary turbulence of the fluid under increasing heat loads to accomplish the highly desirable increase in the rate of heat transference from the cylinder wall to the fluid, thus preventing the cylinder wall temperature from going above a given maximum. While there is a greater differential between minimum and maximum cylinder wall temperatures in the modified form of the invention, such form includes other advantages of the previously described system in that it reduces internal stresses in the cylinder wall; it permits the use of a relatively small volume of temperature controlling fluid; and it permits the engine to warm up more rapidly than is true in conventional systems.

Instead of employing an expansion chamber 90 large enough to provide sufficient space for the expansion of the cooling fluid, a smaller chamber may be employed with the member 91 forming a conventional relief valve which may be of any standard adjustable type. Under such conditions, as pressure builds up in the system, the air will be compressed to the setting of the relief valve, after which further compression of the air will result in the discharge of excess air from the system. This operation is advantageous in that it provides means for controlling the temperature of the fluid being circulated. It is well known that steam at atmospheric pressure in contact with water will not rise aboue 212° F. At 100 lb. absolute, the temperature will be 328° F.; at 200 lb. absolute the temperature will be 382° F. and so on. To obtain a temperature above 212° F., therefore, the system must be closed to permit the building up of higher pressures. The pressure in the present system, and consequently the temperature of the fluid medium, can be readily controlled by adjusting the valve member 91. Such regulation without adjustment, can be obtained by employing air chambers 90 of different sizes.

Whichever way the form of the invention shown in Figure 3 is used, no water pump is required for the circulation of fluid, and the system provides far more rapid circulation than is ordinarily accomplished in a thermo-syphonic cooling system. Moreover, the system is sealed and accordingly prevents any loss of the temperature controlling fluid, and only a small condenser need be employed.

The use of tubing for the fluid circulating passages in the engine is advisable under most conditions because such structure obviously is adapted to withstand the maximum pressures which will occur in the system. For smaller engines operating with moderate pressures the structure in Figure 4 is wholly satisfactory. In such structure the jacket 93 is helically grooved to form a helical passage when the liner 94 is placed in position. In such a construction the temperature controlling fluid is in direct contact with the cylinder liner, thus providing an effective heat transferring relationship.

By using metals of high thermal conductivity for the cylinder liners of the different forms of the invention, the temperature of the cooling fluid undoubtedly can be carried as high as 400° F., thus further reducing the temperature differentials between the cylinder wall and the cooling fluid. If water is used as the cooling fluid, this would result in a pressure of 250 lb. absolute in the cooling system. Of course, liquids other than water may be employed in the system, such as several of the commercially available preparations employed as anti-freeze solutions, at least one of which has a boiling point at 387° F. at atmospheric pressures. Such liquids may be employed to operate the systems at lower pressures.

It is not wholly essential in the practice of the invention that the fluid conduits shown and described be employed in both the cylinder proper and the cylinder head. For example, in one installation which has been developed, the fluid conduit is employed in connection with the cylinder head while the cylinder wall is water cooled in the usual manner. Fairly satisfactory results can be obtained under such conditions since a large part of the heat loss ordinarily occurs through the cylinder head of an engine. It is to be understood therefore that the present invention is not limited to the application of the cooling fluid conduit in both the cylinder wall and cylinder head since it is applicable to either of these elements. Where such an expression as a "fluid conduit in said combustion chamber wall" occurs in the claims it is understood that this expression is intended to cover either the cylinder wall proper or the cylinder head, since this element forms a wall of the combustion chamber, and the expression referred to is likewise intended to cover both the cylinder head and cylinder wall.

As previously stated, water is preferably used as the temperature controlling fluid for the engine. However, it has been pointed out that other fluids may be used and where reference is made to "steam" in the claims it is to be understood that this expression is intended to cover not only the conversion of water into steam but also the vaporizing of other liquids which may be used in the system.

While I have disclosed the preferred practice of the method and the preferred embodiments of the apparatus, it is to be understood that the details of procedure of the method and the shape, size and arrangement of parts of the apparatus may be variously modified without departing from the spirit of the invention or the scope of the subjoined claims.

I claim:

1. In an internal combustion engine having a combustion chamber provided with a wall, a fluid conduit in intimate heat transferring association with said combustion chamber wall, means for effecting a flow of fluid through said conduit, and means in contact with and controlled by the temperature of said combustion chamber wall for controlling the rate of flow of fluid through said conduit.

2. In an internal combustion engine having a combustion chamber provided with a wall, a fluid conduit in intimate heat transferring association with said combustion chamber wall, means for effecting a flow of fluid through said conduit, and means in contact with and controlled by the temperature of said combustion chamber wall for causing the rate of flow of fluid to increase as the combustion chamber wall temperature increases and to cause the rate of fluid flow to decrease as the combustion chamber wall temperature decreases.

3. In an internal combustion engine having a combustion chamber provided with a wall, a tubular conduit in intimate heat transferring association with said combustion chamber wall, means for effecting a flow of fluid through said conduit, said conduit being of such a cross-sectional area that the flow of fluid therethrough becomes at least partially turbulent when the rate of fluid flow exceeds a given rate, to thereby increase the rate of heat transference between said combustion chamber wall and the fluid in said conduit, and means in contact with and controlled by the temperature of the combustion chamber wall to render said first named means effective for increasing the rate of fluid flow as the combustion chamber wall temperature increases, with the rate of fluid flow exceeding said given rate at relatively higher combustion chamber wall temperatures.

4. In an internal combustion engine having a combustion chamber provided with a wall, a tubular conduit in intimate heat transferring association with said combustion chamber wall, means for effecting a flow of fluid through said conduit, means in contact with and controlled by the temperature of the combustion chamber wall for causing the rate of fluid flow to increase as the combustion chamber wall temperature increases and to decrease as the combustion chamber wall temperature decreases, and means governing the pressure of the fluid in said conduit.

5. In an internal combustion engine having a combustion chamber provided with a wall, a tubular conduit in intimate heat transferring association with said combustion chamber wall and of such cross-sectional area and length that steam will be generated therein, cooperating means for effecting a flow of fluid through said conduit with the rate of flow increasing as the combustion chamber wall temperature increases and decreasing as the combustion chamber wall decreases, and means governing the pressure of the fluid in said conduit whereby such pressure progressively increases as the combustion chamber wall temperature progressively decreases.

6. In an internal combustion engine having a combustion chamber provided with a wall, a tubular conduit in intimate heat transferring association with said combustion chamber wall and of such cross-sectional area and length that steam will be generated therein, cooperating means for effecting a flow of fluid through said conduit with the rate of flow increasing as the combustion chamber wall temperature increases, a circulatory system in which said conduit is arranged, a condenser in said circulatory system, and means responsive to pressures in said system for determining the rate of condensation in said condenser.

7. In an internal combustion engine having a combustion chamber provided with a wall, a tubular conduit in intimate heat transferring association with said combustion chamber wall and of such cross-sectional area and length that steam will be generated therein, cooperating means for effecting a flow of fluid through said conduit with the rate of flow increasing as the combustion chamber wall temperature increases, a circulatory system in which said conduit is arranged, a condenser in said circulatory system, and means responsive to pressures in said system for determining the rate of condensation in said condenser, the varying rate of condensation in said condenser and the varying rate of heat transference between the combustion chamber wall and the fluid in said conduit incident to variations in the rate of fluid flow being so related to each other that pressures in said conduit progressively increase as combustion chamber wall temperatures progressively decrease to thereby increase the boiling point of fluid in said conduit at relatively lower combustion chamber wall temperatures to reduce the temperature differential between the combustion chamber wall and the fluid in said conduit.

8. In an internal combustion engine having a combustion chamber provided with a wall, a tubular fluid conduit in intimate heat transferring association with said combustion chamber wall and of such cross-sectional area and length that steam will be generated therein, means for effecting a flow of fluid through said conduit, means for controlling the rate of flow of fluid through said conduit whereby the rate of flow progressively increases under progressively increasing combustion chamber wall temperatures, and an expansion chamber accommodating the expansion of the fluid incident to the generation of steam in said conduit to graduate the temperatures at which steam will be generated under varying pressure conditions in said conduit.

9. In an internal combustion engine having a combustion chamber provided with a wall, a tubular fluid conduit in intimate heat transferring association with said combustion chamber wall and of such cross-sectional area and length that steam will be generated therein, a circulatory system in which said conduit is connected, means for effecting a flow of fluid through said system, means for controlling the rate of flow of fluid whereby the rate of flow progressively increases as the combustion chamber wall temperature increases, an expansion chamber accommodating the expansion of the fluid incident to the generation of steam in said conduit to determine the temperature at which steam will be generated therein, a condenser in said circulatory system, and means responsive to pressures in said system for determining the rate of condensation of steam in said condenser.

10. In combination with an internal combustion engine having a combustion chamber wall, a heat control system comprising a fluid conduit in intimate heat transferring association with said combustion chamber wall, means cooperating with said conduit for circulating fluid therethrough, means for controlling the rate of fluid circulation in accordance with combustion chamber wall temperatures, the cross-sectional area of said conduit and the rate of fluid circulation as effected and controlled by said circulating means and said controlling means being so related as to cause the fluid flow to induce a rate of heat transfer having a substantially constant ratio to the heat units to be removed from the combustion chamber wall to maintain a relatively uniform temperature of the combustion chamber wall.

11. In an internal combustion engine having a combustion chamber provided with a wall, a body of metal of high thermal conductivity in intimate contact with said combustion chamber wall, and a fluid conduit at least partially imbedded in said body of metal and surrounding said combustion chamber wall.

12. In an internal combustion engine having a combustion chamber provided with a wall, a body of metal of high thermal conductivity in intimate contact with said combustion chamber wall, a fluid conduit at least partially imbedded in said body of metal and surrounding said combustion chamber wall, the cross-sectional area of said conduit being such that the flow of fluid therethrough becomes at least partially turbulent when the rate of flow exceeds a given rate, means for effecting the flow of fluid through said conduit, said means being effective for causing fluid to flow through said conduit in excess of said given rate, and means contacting with and responsive to the temperature of said combustion chamber wall for controlling the rate of flow through said conduit with the rate of flow exceeding said given rate at relatively high combustion chamber wall temperatures.

13. In an internal combustion engine having a combustion chamber provided with a wall, a fluid conduit in intimate heat transferring association with said combustion chamber wall, means for effecting a flow of fluid through said conduit, means controlled by the temperature of said combustion chamber wall for causing the rate of flow of fluid through said conduit to increase as the combustion chamber wall temperature increases, a circulatory system in which said conduit is arranged, a condenser in said circulatory system, and means responsive to pressures in said system for determining the rate of condensation in said condenser.

14. In an internal combustion engine having a combustion chamber provided with a wall, a fluid conduit in intimate heat transferring relationship with said combustion chamber wall, said conduit being of such construction and arrangement that steam will be generated therein, a circulatory system in which said conduit is arranged a condenser in said circulatory system, and means responsive to pressures at a predetermined point in said system for determining the rate of condensation in said condenser, the varying rate of condensation in said condenser being such that pressures in said conduit progressively increase as combustion chamber wall temperatures progressively decrease to thereby increase the boiling point of fluid in said conduit at relatively lower combustion chamber wall temperatures.

15. In an internal combustion engine having a combustion chamber provided with a wall, a fluid conduit in intimate heat transferring relationship with said combustion chamber wall, said conduit being of such construction and arrangement that steam will be generated therein, means for effecting a flow of fluid through said conduit with the rate of flow increasing as the combustion chamber wall temperature increases, a circulatory system in which said conduit is arranged, a condenser in said circulatory system, and means responsive to pressures in said system for determining the rate of condensation in said condenser, the varying rate of condensation in said condenser and the varying rate of heat transference between the combustion chamber wall and the fluid in said conduit incident to variations in the rate of fluid flow being so related to each other that pressures in said conduit progressively increase as combustion chamber wall temperatures progressively decrease to thereby increase the boiling point of fluid in said conduit at relatively lower combustion chamber wall temperatures to reduce the temperature differential between the combustion chamber wall and the fluid in said conduit.

16. In an internal combustion engine having a combustion chamber provided with a wall, a tubular fluid conduit in intimate heat transferring association with said combustion chamber wall and of such cross-sectional area and length that steam will be generated therein, a circulatory system in which said conduit is connected, means for effecting a flow of fluid through said system, and means constructed and arranged to be subject to temperatures in said combustion chamber wall to change the rate of flow of fluid and thus induce a new rate of heat transfer from said combustion chamber wall to the fluid, which will tend to return the combustion chamber wall to its original temperature.

17. In an internal combustion engine having a combustion chamber provided with a wall, a tubular conduit in intimate heat transferring association with said combustion chamber wall and of such cross-sectional area and length that steam will be generated therein, cooperating means for effecting a flow of fluid through said conduit, means having a portion in contact with the combustion chamber wall for controlling the rate of flow of the fluid with the rate of flow increasing as the combustion chamber wall temperature increases and decreasing as the combustion chamber wall temperature decreases, and means governing the pressure of the fluid in said conduit whereby such pressure progressively increases as the combustion chamber wall temperature progressively decreases.

JOSEPH G. KIMMEL.